United States Patent [19]

Bowes et al.

[11] Patent Number: 4,548,709

[45] Date of Patent: Oct. 22, 1985

[54] HYDROTREATING PETROLEUM HEAVY ENDS IN AROMATIC SOLVENTS WITH DUAL PORE SIZE DISTRIBUTION ALUMINA CATALYST

[75] Inventors: Emmerson Bowes, Hopewell; Malvina Farcasiu; Eric J. Y. Scott, both of Princeton, all of N.J.

[73] Assignee: Mobil Oil Corporation, New York, N.Y.

[21] Appl. No.: 628,117

[22] Filed: Jul. 5, 1984

Related U.S. Application Data

[63] Continuation of Ser. No. 490,076, Apr. 29, 1983, abandoned.

[51] Int. Cl.[4] ........................ C10G 45/08; C10G 45/60

[52] U.S. Cl. .............................. 208/213; 208/216 PP; 208/251 H

[58] Field of Search ............. 208/213, 216 PP, 251 H, 208/216 R

[56] References Cited

U.S. PATENT DOCUMENTS

| | | | |
|---|---|---|---|
| 2,464,810 | 3/1949 | Hirsch et al. | 208/113 |
| 3,785,967 | 1/1974 | van Klinken | 208/216 PP |
| 4,032,433 | 6/1977 | Petri et al. | 208/112 |
| 4,089,774 | 5/1978 | Oleck et al. | 208/89 |
| 4,102,822 | 7/1978 | Mulaskey | 252/465 |
| 4,212,729 | 7/1980 | Hensley, Jr. et al. | 208/210 |
| 4,257,922 | 3/1981 | Kim et al. | 252/465 |
| 4,271,042 | 6/1981 | Oleck et al. | 252/439 |
| 4,317,712 | 3/1982 | Farcasiu | 208/46 |
| 4,329,221 | 5/1982 | Farcasiu et al. | 208/214 |
| 4,341,625 | 7/1982 | Tamm | 208/216 PP |
| 4,395,329 | 7/1983 | Le Page et al. | 208/251 H |
| 4,421,633 | 12/1983 | Shih et al. | 208/59 |
| 4,434,048 | 2/1984 | Schindler | 208/112 |
| 4,435,278 | 3/1984 | Chen | 208/110 |
| 4,454,026 | 6/1984 | Hensley, Jr. et al. | 208/264 |
| 4,465,789 | 8/1984 | Lindsley | 208/254 H |

*Primary Examiner*—D. E. Gantz
*Assistant Examiner*—O. Chaudhuri
*Attorney, Agent, or Firm*—Alexander J. McKillop; Michael G. Gilman; James F. Powers, Jr.

[57] ABSTRACT

Residual oils containing metals and sulfur are demetalized and desulfurized by adding to the oil an aromatic solvent and contacting the mixture in the presence of hydrogen with an alumina having dual pore size distribution in ranges of 90-200 Angstrom units and 1000-5000 Angstrom units.

12 Claims, No Drawings

HYDROTREATING PETROLEUM HEAVY ENDS IN AROMATIC SOLVENTS WITH DUAL PORE SIZE DISTRIBUTION ALUMINA CATALYST

This is a continuation of copending application Ser. No. 490,076, filed on Apr. 29, 1983 now abandoned.

BACKGROUND OF THE INVENTION

This invention is concerned with catalytic processes for demetalizing and desulfurizing petroleum oils, particularly the heavy petroleum ends and residual fractions with undesirably high metals and/or sulfur and/or Conradson carbon residue contents.

DESCRIPTION OF THE PRIOR ART

Residual petroleum oil fractions produced by atmospheric or vacuum distillation of crude petroleum are characterized by relatively high metals and sulfur content. This comes about because practically all of the metals present in the original crude become concentrated in the residual fraction and a disproportionate amount of sulfur in the original crude oil also remains in the residual fraction. Principal metal contaminants are nickel and vanadium, with iron and small amounts of copper also sometimes present. Additionally, trace amounts of zinc and sodium are found in some feedstocks. The high metals content of the residual fractions generally preclude their effective use as charge stocks for subsequent catalytic processing such as catalytic cracking and hydrocracking. The metal contaminants deposit on the special catalysts for these processes and cause the premature aging of the catalyst and/or formation of in ordinate amounts of coke, dry gas and hydrogen.

U.S. Pat. No. 4,035,287 discloses a method for desulfurizing oils which comprises contacting the oil with a solvent selective for low molecular weight aromatics thereby producing a low-sulfur, high-metals content raffinate and a low-metals, high-sulfur metals extract. U.S. Pat. No. 4,271,042 discloses a process for removing metal and sulfur contaminants from oil fractions by catalytic contact with specified metal sulfides or oxides supported on an alumina that contains at least 45% of its pore volume in pores of 30–150 Angstroms in diameter. These two patents are incorporated herein by reference.

SUMMARY OF THE INVENTION

It has now been found that a hydrocarbon oil containing both metals and sulfur contaminants may be effectively demetalized and desulfurized by adding to the oil a selected aromatic solvent and subsequently contacting the oil with hydrogen and with an alumina characterized as a duel pore size distribution alumina. The process is conducted under conditions sufficient to effect demetalation and desulfurization. The term "dual pore size distribution alumina", as used herein, is defined as an alumina showing two distinct concentrations of pore sizes, one with pore sizes concentrated in the range of 90 to 200 Angstrom units with a pore volume in this region of between 0.35 and 0.7 (preferably 0.5) cc per gram and a second in the range of 1000 to 5000 Angstrom units and a pore volume of 0.2 cc/gram. The desired pore size distributions are obtained by precalcining part of the alumina powder before mixing with the remainder and forming the catalyst particle. The precalcined alumina is present in the mixture in a concentration of between 35 and 80 (preferably 65) parts by weight and the uncalcined alumina is present in a concentration of between 65 and 20 (preferably 35).

DESCRIPTION OF THE INVENTION

The hydrocarbon feed to the process of this invention can be a whole crude. However, since the high metal and sulfur components of a crude oil tend to be concentrated in the higher boiling fractions, the present process more commonly will be applied to a bottoms fraction of a petroleum oil, i.e., one which is obtained by atmospheric distillation of a crude petroleum oil to remove lower boiling materials such as naphtha and furnace oil, or by vacuum distillation of an atmospheric residue to remove gas oil. Typical residues to which the present invention is applicable will normally be substantially composed of residual hydrocarbons boiling about 650° F. and containing a substantial quantity of asphaltic materials. Thus, the charge stock can be one having an initial or 5 percent boiling point somewhat below 650° F., provided that a substantial proportion, for example, about 70 or 80 percent by volume, of its hydrocarbon components boils about 650°0 F. A hydrocarbon stock having a 50 percent boiling point of about 900° F. and which contains asphaltic materials, 4% by weight sulfur and 51 ppm nickel and vanadium is illustrative of such charge stock.

The charge stock is mixed with an aromatic solvent which can be benzene, toluene, other substituted benzenes, light cycle oil reformates and other aromatic streams derived from petroleum refining operations. The volumetric ratio of aromatic solvent to feed preferably is between 1:1 and 3:1. The mixture is then charged to a catalyst bed along with hydrogen under conditions conducive to demetalation and desulfurization.

Generally, all of the catalysts comprise a dual pore size distribution catalyst comprising a mixture of aluminas having two concentrations of pore sizes, one concentrated in the range of diameters of between about 90 and about 200 Angstrom units and having also a pore volume of between about 0.35 and about 0.7 cc per gram of alumina and a second having pore diameters between about 1000 and about 5000 Angstroms and a pore volume of about 0.2 cc per gram of alumina.

Alumina having the dual pore size distribution of this invention is prepared by calcining preferably an alpha alumina monohydrate or pseudo boehmite at a temperature of about 1400° F. This powder is then mixed with 25% to 185% of its own weight on an anhydrous basis, of the uncalcined alpha-alumina monohydrate. The composite is pelleted or extruded and recalcined for a period of 1 to 10 hours, preferably 3 hours, at a temperature of about 1400° F. The ratio of the twice calcined product to the once uncalcined product can be on the order of 65 to 35 parts by weight. This is the most preferred composition. This procedure, involving a first calcination, mixing and a second calcination, as prescribed above forms the alumina portion of the catalyst of this invention.

Typical process conditions may be defined as contacting a metal and/or sulfur and/or CCR contaminant-containing charge stock with the catalyst described herein at a hydrogen pressure of about 300 to 3000 psig at 600° to 850° F. temperature, and 0.1 to 5 LHSV (i.e., 0.1 to 5 volumes of charge stock per volume of catalyst per hour).

The hydrogen gas which is used during the hydrodemetalation, hydrodesulfurization, and CCR removal is circulated at a rate between about 1,000 and 15,000 s.c.f./bbl. of feed and preferably between about 2,000 and 8,000 s.c.f./bbl. The hydrogen purity may vary from about 60 to 100 percent. If the hydrogen is recycled, which is customary, it is desirable to provide for bleeding of a portion of the recycle gas and to add makeup hydrogen in order to maintain the hydrogen purity within the range specified. The recycled gas is usually washed with a chemical absorbent for hydrogen sulfide or otherwise treated in a known manner to reduce the hydrogen sulfide content thereof prior to recycling.

For the purpose of this invention, it is preferred to use catalyst particles such as 1/32-inch extrudate or the equivalent disposed in fixed beds.

Although this method of demetalation and desulfurization is useful in a continuous flow system it can also be utilized in batch processes in which the aromatic solvent or aromatic refinery stream, residual oil and alumina are contacted in the proportions previously discussed and for periods up to one-half to 4 hours.

EXAMPLES

Tests were run with five heavy oil samples of the following sulfur, nitrogen and nickel and vanadium content.

TABLE 1

PROPERTIES OF FEEDS

| Sample | | Wt % S | ppm Ni | ppm V |
|---|---|---|---|---|
| A | Arab Lt. Vac. Resid | 4.0 | 17 | 70 |
| B | Cold Lake Atm. Resid, Light Cycle Oil | 2.3 | 24 | 57 |
| C | Arab Hvy. Topped Crude | 3.5 | 18 | 60 |
| D | Arab Hvy. Resid, Light Cycle Oil | 2.3 | 15 | 40 |
| E | Arab Hvy. Resid | 5.2 | 45 | 145 |

The A and E samples were mixed with ortho-xylene in ratios of 1:8 and 1:4 respectively. In the B and D samples the resids were mixed with an aromatic light cycle oil in a ratio of 1 and 3. Sample C was a blank run without any aromatics added.

The samples were demetalized and desulfurized by pressuring them in an autoclave for one hour at 350° C. and 1000 psi. The partial pressure of hydrogen was 1000 psi at 25° C. Results are shown below in Table 2.

TABLE 2

Desulfurization and Demetalation of Petroleum Resids in Aromatic Solvents
Autoclave runs 1 h, 350° C., 1000 psi $H_2$ (initial)

| Run | | % Removed S | % Removed Ni | % Removed V | $H_2$ consumption soft/barrel[1] |
|---|---|---|---|---|---|
| A | Arabian Light Vac. Resid[2] in o-xylene | | | | |
| | (1) HSD 1441[4] | 65 | 58 | 77 | (1107) |
| | (2) LPS Catalyst[5] | 67 | 99 | 98 | (576) |
| B | Cold Lake Amt. Resid, LCO[2,3] | | | | |
| | (3) HDS 1441[4] | 70 | 77 | 67 | 532 |
| | (4) LPS[5] | 72 | 93 | 96 | 468 |
| | (5) Dual Distrib. catalyst[6] | 72 | 93 | 97 | 320 |
| C | Arabian Heavy Topped Crude[2] | | | | |
| | (6) HDS 1441[4] | 43 | 39 | 35 | 494 |
| | (7) LPS[5] | 29 | 59 | 50 | 338 |
| | (8) DD[6] | 29 | 59 | 52 | 245 |
| D | Arabian Heavy Resid Cycle Oil[2] | | | | |
| | (9) HDS 1441[4] | 53 | 67 | 50 | — |
| | (10) LPS[5] | 53 | 89 | 93 | 367 |

TABLE 2-continued

Desulfurization and Demetalation of Petroleum Resids in Aromatic Solvents
Autoclave runs 1 h, 350° C., 1000 psi $H_2$ (initial)

| Run | | % Removed S | % Removed Ni | % Removed V | $H_2$ consumption soft/barrel[1] |
|---|---|---|---|---|---|
| | (11) DD[6] | 60 | 85 | 83 | 241 |
| E | Arabian Heavy Resid[2] in o-xylene | | | | |
| | (12) HDS 1441[4] | 49 | 49 | 38 | (802) |
| | (13) LPS[5] | 59 | 98 | 97 | (343) |

[1]Numbers in parenthesis are soft/bbd of resid when solvent is unreactive
[2]Properties of feeds appear in Table 1.
[3]LCO = Light Cycle Oil
[4]HDS 1441 catalyst average pore 70-80 Angstroms
[5]LPS catalyst average pore size 220 Angstroms
[6]Dual distrib. catalyst prepared as described herein.

In Runs (1), (3), (6), (9) and (12) the catalyst was a commercial hydrodesulfurization catalyst having an average work size diameter of 70-80 Angstroms.

In runs (2), (4), (7), (10) and (13) the catalyst was a large pore size useful in demetalizing and desulfurizing which is the subject of a copending application. Runs (5), (8) and (11) were run with the dual pore size distribution alumina.

In comparing runs (5), (8) and (11) to runs (3), (6), (9) and (12), it is readily apparent that the samples were more readily demetalized by the dual pore size alumina without any reduction in desulfurization. It should be noted in runs (6) and (8) demetalization was not nearly as effective in the absence of aromatics. In runs (5), (8) and (11) substantially less hydrogen was used to achieve the improved desulfurization and demetalization.

It will be readily apparent to those skilled in the art that the effluent product obtained from contacting the charge stock with aromatic solvents and hydrogen can be fractionated into a product stream of residual oil having a greatly reduced sulfur and metals content.

What is claimed is:

1. A process for demetalizing and desulfurizing a residual oil which comprises:

(a) mixing said residual oil with an aromatic solvent;

(b) passing the resulting mixture of residual oil and solvent together with hydrogen in contact with a catalyst prepared by (i) calcining an alpha alumina monohydrate or pseudo boehmite at a temperature of about 1400° F., (ii) mixing the resultant calcined product with between about 25 to about 185 percent of its own weight with uncalcined alumina monohydrate or pseudo boehmite; and (iii) calcining the resultant mixture at a temperature of about 1400° F.; and (iv) recovering a mixture of aluminas having two concentrations of pore sizes, one concentrated in the range of diameters of between about 90 and about 200 Angstrom units and having also a pore volume of between about 0.35 and about 0.7 cc per gram of alumina and a second having pore diameters between about 1000 and about 5000 Angstrom and a pore volume of about 0.2 cc per gram of alumina;

(c) recovering from the resulting product stream a residual oil having a substantially reduced sulfur and metals content obtained using substantially reduced amounts of hydrogen compared to known processes.

2. The process of claim 1 wherein said solvent is selected from the group consisting of benzene, toluene, xylene and light cycle oil reformates.

3. The process of claim 1 wherein the step of passing (b) is conducted at a temperature between about 300° C. and about 425° C.

4. The process of claim 1 wherein the step of passing (b) is conducted at an LHSV between about 0.1 and about 5.

5. The process of claim 1 wherein said step of passing in (b) is conducted at a hydrogen pressure of between about 300 and about 3000 psig.

6. The process of claim 1 wherein the volumetric ratio of aromatic solvent to residual oil is between 0.5 and 10.

7. The process of claim 1 wherein said process is conducted as a batch process.

8. The process of claim 1 wherein the period of contact time is between about one-half and about 4 hours.

9. The process of claim 1 wherein the uncalcined monohydrate or pseudo boehmite of step (ii) is present in the mixture before final calcination in a concentration of between about 65 and about 20 percent by weight.

10. The process of claim 1 wherein the resultant calcined alumina of (i) is present in the mixture of (ii) in a concentration of between about 35 and about 80 percent by weight.

11. The process of claim 1 wherein the uncalcined alumina of (ii) is present in the mixture of ii in a concentration of about 35 percent by weight.

12. The process of claim 1 wherein the resultant calcined alumina (ii) is present in the mixture of (ii) in a concentration of about 65 percent by weight.

* * * * *